United States Patent Office 3,013,300
Patented Dec. 19, 1961

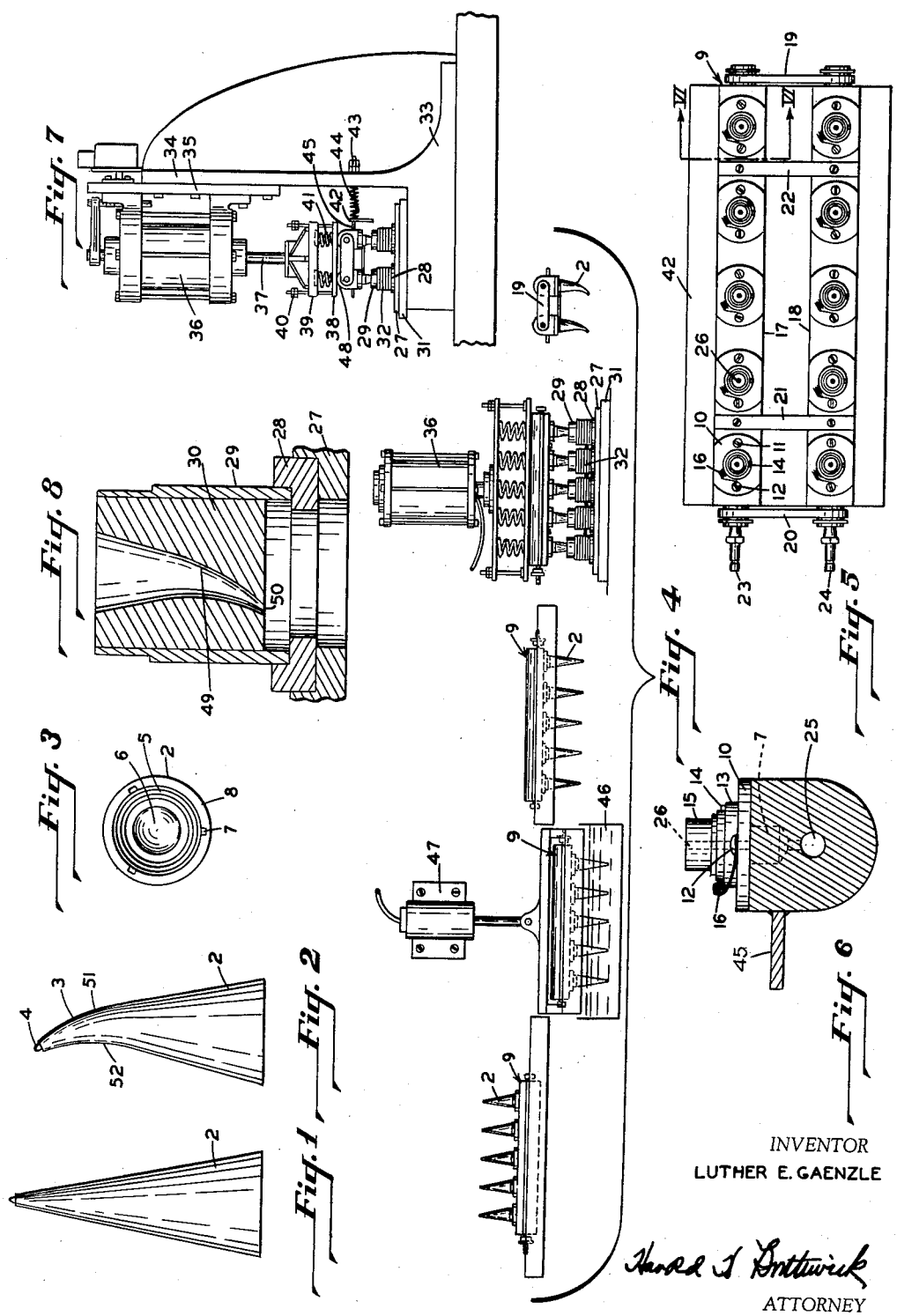

3,013,300
APPARATUS FOR POSTFORMING MOLDED THERMOPLASTIC ARTICLES
Luther E. Gaenzle, Lancaster, Pa., assignor to Armstrong Cork Company, Lancaster, Pa., a corporation of Pennsylvania
Filed July 9, 1958, Ser. No. 747,458
6 Claims. (Cl. 18—5)

This invention relates to an apparatus for postforming molded thermoplastic articles and is concerned more particularly with the postforming of injection molded bottle closures to provide unique shapes which cannot be produced economically with conventional injection molding dies.

Bottle closures are commonly produced by injection molding of thermoplastic resin compositions, such as polystyrene resin compositions. Generally the closures are molded with an internal screw thread which is adapted to engage a corresponding screw thread projection on the container to which the closure is attached. The outer contour of the closure usually is such that when the molding cycle has been completed, the closure can be extracted from within the mold cavity, attached to the threaded force plug which forms the internal surface of the closure. The closure can be removed from the force plug by unscrewing. This type of injection molding unit is disclosed in the patent to Gardiner C. Wilson, No. 2,799,049. With this type of injection molding, it is not necessary to "split" the mold cavity to extract the formed piece. This is quite undesirable in the manufacture of closures; for which a split mold is used, there inevitably is a thin line of "flash" which is developed on the molded piece at the juncture line where the mold sections part, and this flash must be removed before the closures are ready for sale. This flash removal operation requires additional fabricating; and, even though carefully done, there still remains a "scar" on the finished closure where the flash has been removed.

Heretofore it has been necessary to use split molds in the formation of closures and other molded articles which are so shaped that they cannot be withdrawn from within the mold cavities by a straight or axial movement of the force plugs which form the interior of the closures.

Another problem involved in the molding of closures and other articles having an outer configuration which prevents the finished molded piece from being extracted from within the mold cavity by a straight line or axial movement is the problem of forming the cavity molds. These molds normally are formed by a "hobbing" process in which a steel "hob" is formed corresponding to the outer shape to be formed on the article to be molded. This hob is then hardened. The hardened hob is then pressed into a soft steel cavity mold piece and withdrawn. This forms a mold cavity which conforms precisely to the shape of the hob. The cavity is then finished by hardening, chromium plating, and polishing. With hob-formed cavities, it is essential that the outer configuration of the piece to be molded and which is represented in image in the hob be extractable by a straight line motion, for otherwise the hob cannot be inserted into and removed from the soft metal to form the cavity mold.

An object of the invention is to provide an apparatus for forming molded articles, such as bottle closures, having an outer configuration which cannot be obtained in conventional one-part or nonsplit mold cavities.

Another object of the invention is to provide an apparatus for postforming thermoplastic articles capable of formation with conventional molding tools to reshape the articles to configurations which could not be attained with such conventional molding tools.

Other objects of the invention will be clear from consideration of the following description of an embodiment of the invention which will be given in conjunction with the attached drawing, in which:

FIGURE 1 is a front view of a conically shaped bottle closure;

FIGURE 2 is a front view of the same bottle closure after postforming;

FIGURE 3 is a bottom view of the closure shown in FIGURES 1 and 2;

FIGURE 4 is a diagrammatic view showing equipment which may be used in the practice of the method of the invention;

FIGURE 5 is a top plan view of an article mounting support forming part of the apparatus of the invention;

FIGURE 6 is a sectional view taken along the line VI—VI of FIGURE 5;

FIGURE 7 is a side elevational view of the postforming press with the postforming dies and other units of the equipment mounted therein; and FIGURE 8 is a sectional view, to a larger scale than the other views, showing a postforming die cavity for formation of an article having the contour of the closure of FIGURE 2 from a molded closure having the conical configuration of FIGURE 1.

For simplicity of illustration and description, a simple conically shaped bottle closure 2, as shown in FIGURE 1, has been chosen to illustrate the method and apparatus. It is to be postformed to have a gradually curved upper end 3, as shown in FIGURE 2. This type of bottle closure may be used on a glass container of generally triangular shape containing a sweetening solution to be used in substitution for sugar. The top of the closure 2 terminates in a point 4 which may be cut off with a pair of scissors to provide a small opening through which the sweetening solution may be dispensed from the bottle. As shown in FIGURE 3, the closure 2 is formed internally with a screw thread projection 5 for attachment of the closure to a bottle, and the interior head portion 6 of the closure is hollow, leading up to the top portion 4, as shown in FIGURES 1 and 2. A plurality of small rectangularly shaped recesses 7 are molded into the lower skirt wall 8 of the closure, as shown in FIGURE 3. These serve a dual function. They are formed by projecting lugs on the force plate rings of the molding tools, and thus they serve to prevent rotation of the cap 2 during unscrewing of the force plugs from the screw thread formation on the interior of the closure upon completion of the molding operation. They also serve to align the closures on holders during postforming, as will be more fully described hereinafter.

It will be clear from the showing of FIGURE 1 that the closure 2 may be molded with conventional injection molding tools and extracted from the mold cavity in which it is formed in an axial direction, without using a split mold and parting it. It will be equally clear from FIGURE 2 that in the final desired shape the closure could not be formed with conventional nonsplit injection molding tools.

According to the present invention, the closure 2 of FIGURE 1 and other closures similarly shaped are mounted in fixed position upon a mounting fixture 9, as shown in the left-hand portion of FIGURE 4. The mounting fixture is shown in FIGURE 5, and a single article holder is shown in FIGURE 6. In the embodiment shown in FIGURE 5, the mounting fixture 9 carries ten article holders 10 which are fastened by machine screws 11 and 12 to the mounting fixture. Each holder 10 includes a closure skirt supporting flange 13 from which projects an aligning lug 14 shaped to fit within one of the recesses 7 (FIGURE 3) in the skirt of the closure. The aligning lug 14 serves to so position the cap that after it is postformed and mounted on a triangularly shaped bottle, the curved top portion 3 of the closure will project in the desired direction with respect to the side walls of the bottle for convenient grasp of the bottle and dispensing of the contents of the bottle, held in a natural position within the grasp of the fingers of the user. The recesses 7 are so positioned with respect to the turn of the internal screw thread in the closure that this desired alignment is achieved. The lug 14 also serves to prevent rotary motion of the closure with respect to the holder during the postforming step. The holder also includes a post 15 adapted to be received within the closure in the screw threaded area for abutment against the projecting thread. This is to aid in holding the cap against misalignment during postforming. A small coil spring clip 16, fastened under screw 12, is positioned to engage the outer wall of the closure skirt to frictionally hold the closure on the holder when the molding support, with the closures positioned thereon, is inverted.

The support may be made in two sections 17 and 18 (FIGURE 5) hinged together by hinge lugs 19 and 20 to permit any slight rotary movement necessary in the support as the closures are forced into the postforming die cavities as will be explained below. For some configurations, such rotary motion of the support sections is not needed; and, in such case, the connecting bars 21 and 22 may be attached. This makes the unit somewhat easier to handle manually.

An air ejector system is provided for removing the closures from the mounting fixture 9. It includes bayonet air connectors 23 and 24 which project from the fixture, as shown in FIGURE 5. These may be arranged to be inserted into suitable air line ports by manual manipulation of the fixture. The connectors 23 and 24 lead to manifolds, one of which is shown in FIGURE 6, and is numbered 25. Passageways 26 lead from the manifolds 25 to the tops of each of the holders 10, as shown in dotted lines in FIGURE 6.

The cavity die assembly is shown mounted in an air cylinder actuated press in FIGURE 7, and one of the cavity dies is shown in section in FIGURE 8. The assembly includes a die plate 27, mold shell holder rings 28, mold shells 29, and mold cavity die members 30 received in the shells 29 and all suitably connected together. The mold cavity members are spaced in two rows for alignment with the holders of the closure mounting fixture 9. The die plate 27 may be fastened to the platen 31 of the press, as shown in FIGURE 7.

An arrangement is provided for heating the mold cavity members. In the embodiment shown in FIGURES 4 and 7, strip type electrical resistance heaters 32 are wound around the mold shells 29 at the lower portions thereof where the actual postformation of the closures is effected. These heaters are thermostatically controlled to maintain the desired temperature at the forming surface of the cavity die members.

The cavity die members 30 preferably are formed by casting a low melting point alloy about a pattern of the desired configuration. In practice, the pattern may be machined from brass; and when a closure of the configuration shown in FIGURE 2 is to be formed, with a curved top portion, the pattern will be formed with a slightly greater curvature than desired in the final piece. This permits more rapid fabrication of the postformed articles, for it permits removal from the mold cavities while hot, the "overcurvature" compensating for the inherent "spring-back" of the articles when extracted from the dies.

The brass pattern, suitably supported, has the melted alloy cast around it. An alloy of bismuth and tin having a melting point of about 281° F. has been found to be acceptable. When the alloy has cooled and hardened, the pattern is withdrawn with an arcuate motion, leaving a die cavity corresponding to the outer surface of the brass pattern. To improve the wear resistance of the cavity dies, they are subsequently copper, nickel, and chromium plated. The castings are machined and press-fitted into the shells 29. It will be noted in FIGURE 8 that the tip end of the cavity mold is open. This is important for a number of reasons. First, it relieves the pressure on the top or tip end of the closure during bending in postforming, avoiding the creation of "wrinkles" on the inner curve at the bent portion. It permits the escape of air from within the die as the molded piece is moved to its final forming position within the die, and it also permits the escape of water or other liquid which may be present on the surface of the closure as a result of preheating the closures in heated water or other preheating bath prior to postformation.

The press preferably is an air cylinder actuated press, as shown in FIGURES 4 and 7. It includes a horizontal base 33 which receives the platen 31 and a vertical standard 34 to which a mounting plate 35 is attached which carries the air cylinder power unit 36. The upper head of the press is attached to the piston 37 of the air cylinder power unit. Preferably, the head is spring-cushioned. In the embodiment illustrated, there is an upper head platen 38 which is connected to the upper press head 39 by guiding bolts 40 which are displaceable from the position shown in FIGURE 4 to that shown in FIGURE 7, for example. Mounted between the platen 38 and the head 39 are a plurality of compression springs 41. Thus, the pressure applied to the platen 38 by the power unit 36 is through the springs 41. This permits the pressure to be built up gradually, and the molded pieces are yieldingly pressed into the mold cavities.

Mounted on the vertical standard 34 of the press is a spring-urged guide plate 42, secured to the standard 34 by two spaced bolts 43 which pass through coil compression springs 44, one of which is shown in FIGURE 7. The plate 42 is positioned to engage a guiding flange 45 welded to mounting fixture 9, as shown in FIGURE 6. This spring-urged guide arrangement serves to control any lateral displacement of the fixture as the closures are pressed into the die cavities, as will be more fully explained in connection with the description of an embodiment of the method invention which follows.

In practice of the method, an operator takes closures of the shape shown in FIGURE 1 and presses them individually onto the holders 10 of the mounting fixture 9, with a post 15 disposed within each closure and with a spring clip 16 engaging the outer wall of each closure. The operator rotates the closure slightly, if necessary, as it is applied to the holder to bring the lug 14, the holder, and one of the recesses 7 (FIGURE 3) of the closure into alignment and interengagement. When the fixture has been completely loaded with closures, as shown in FIGURE 4 (left-hand portion), the fixture is inverted and moved into the next operating station where the closures on the fixture are dipped into a preheating bath, as indicated at 46. A water bath maintained at boiling temperature, about 212° F., is ideally suited for this purpose. A power actuated device 47 may be provided for moving a loaded fixture into and out of the bath, or this may be accomplished manually. Immersion in the bath for about twelve seconds at about 212° F. is adequate for preheating the closures for postformation from the shape shown in FIGURE 1 to the shape shown in FIGURE 2, with the closure molded of a filled polystyrene resin composition. The dwell time and bath temperature will vary with the molding composition used, the size and wall thickness of the molded piece, the amount of deformation required in postforming, and other variable factors.

After preheating, the fixture 9 is removed from the bath, and the water drains rapidly from the outer surfaces of the closures. The fixture is immediately transferred to the postforming press station. There an operator grasps the fixture 9 and, with the press in "open position," inserts the closures into the openings in the cavity dies. These cavity dies are all aligned so that the curvature of the cavities are toward the front of the press, as shown in FIGURE 8. They are heated by the electrical strip heaters to a temperature of about 165° F., for example.

The press is then closed by actuation of its air cylinder power unit, and platen 38 is brought into engagement with the curved upper surfaces 48 of the closure mounting fixture, as shown in FIGURE 7. The tip end of each closure in preheated condition first engages the curved wall surface 49 of the cavity die into which it is thrust; and as pressure builds up against springs 41, each closure is bent or postformed as its tip slides along the curved surface 49 of the cavity die and passes out of the lower opening 50 in the cavity die. Gradually increasing pressure is developed during downward movement of the press until the molded closures have been bent and pressed to final position in engagement with the walls of their respective postforming die cavities. The pressure is yielding throughout, and any tendency for the fixture to rock during this step is restrained by the spring-urged guide plate 42 while any necessary slight rocking movement is permitted.

With a ten-unit operation, as shown in the drawing, operating upon polystyrene molded closures, as mentioned above, with a closure preheat temperature of 212° F. and a cavity die temperature of about 165° F., a total pressure of about 150 pounds is adequate to effect the desired postforming.

It is desirable to close the press rather slowly; for during the postforming, the portion 51 of the closure (FIGURE 2) is stretched and the portion 52 is compressed. If a rapid positive displacement punch-pressing operation were used, the portion 52 would be quite prone to wrinkle, forming an objectionable ridge or ridges in the area 52. Satisfactory results have been achieved when operating under the conditions mentioned above with a time cycle of 12 seconds for closing the press to bring the closures into conforming engagement with the die cavities. To avoid any abrupt thrust on the closures as they approach their final positions within the mold cavities, the air cylinder power unit may be provided with a pressure relief valve to limit the pressure application. With the springs 41 interposed between the upper platen 38 and the holding fixture, however, this is not essential.

It is desirable to maintain the press in closed condition for a short period of time with the closures in engagement with the heated cavity walls. A dwell time of about five seconds has been found to be adequate with filled polystyrene molded closures of the configuration shown. The press may be opened quickly. A two-second opening cycle is satisfactory, making a total time cycle of 19 seconds for the postforming operation in the press. This is consistent with the preheating cycle, with a 12-second immersion time, providing seven seconds for removal of the load-holding fixture from the preheating bath and transfer of it to the postforming station.

When the press is open, the operator grasps the fixture manually in the vicinity of the hinge straps 19 and 20 (FIGURE 5) and with a lifting and forward rocking motion lifts the fixture, withdrawing the closures from within the cavity dies. As mentioned above, it is preferred to align the cavity dies so that the postformed closures curve toward the front of the press. This facilitates extraction in the manner recited above. The operator then inverts the fixture over a takeaway conveyor or tote box, inserts the bayonet air connections 23 and 24 into air supply lines and blows the closures off the holders. The holding fixture is then ready to receive a new supply of closures to be postformed and the operation is repeated.

The invention has been described above in connection with a relatively simple postforming operation on a closure injection molded from a filled thermoplastic polystyrene resin composition. It is obvious that the invention is not limited to the postformation of bottle closures or to the use of polystyrene compositions. The invention is applicable to the postformation of thermoplastic compositions generally and to articles of different types and configurations.

I claim:

1. An apparatus for postforming a hollow open ended molded thermoplastic article comprising means for preheating the portion of said article to be postformed, a heated cavity die having a forming surface therein, said cavity die having an open end through which said article to be postformed may be entered into said die, an article support to receive an article to be postformed in said cavity die, said support having a projection which is received within the open end of said article to hold the article against distortion adjacent to its open end, with the remainder of the article unsupported and free for deformation in postforming, and yielding pressure-applying means for applying force to said article through said support to press said article entered into said die through said open end into engagement with said forming surface of said cavity die.

2. An apparatus for postforming molded thermoplastic articles comprising means for preheating the portion of said article to be postformed, a heated cavity die having an open end through which said article to be postformed may be entered into said die, said die having a curved forming surface leading from said open entrance end thereof, an article support for holding an article to be postformed in said cavity die against displacement with respect thereto during postforming, said support including a projection which extends only partially into the open end of the article to support the same against distortion at the open end while the remainder of the article is unsupported and free for deformation in postforming, yielding pressure-applying means for applying force to said article through said support to press said article entered into said cavity die through said open entrance end thereof into engagement with said curved forming surface of said cavity die, and yielding means for restraining lateral motion of said support with respect to said pressure-applying means during movement of said article being postformed along said curved forming surface.

3. An apparatus for simultaneously postforming a plurality of open ended molded thermoplastic articles comprising means for preheating the portion of said articles to be postformed, a plurality of heated cavity dies having open entrance ends through which said articles to be postformed may be entered into said dies and open terminal ends through which the tips of the postformed articles may pass, said dies having curved forming surfaces leading from said open entrance ends thereof to said open terminal ends thereof, means for securing said cavity dies in a unitary assembly with their curved forming surfaces all extending in essentially the same direction, a support including a plurality of individual holders for securing the articles to be postformed in said cavity dies against displacement with respect to said support during postforming, means on the individual holders for engaging the open ends of said articles to support the same against distortion at the open end while the remainder of the articles are unsupported and free for deformation, and pressure-applying means movable toward said cavity dies and engageable with said supports to press said articles on said holders into said cavity dies.

4. An apparatus for simultaneously postforming a plurality of molded thermoplastic articles comprising means for preheating the portion of said article to be postformed, a plurality of cavity dies having open ends through which said articles to be postformed may be entered into said dies, said dies having curved forming surfaces leading from said open entrance ends thereof, means for securing said cavity dies into an assembly of two rows with the curved forming surfaces of all of said dies in both rows extending in essentially the same direction, a support including two sections hinged together for independent rocking movement and each including a row of spaced article holders for securing articles to be postformed in said two rows of cavity dies against displacement with respect to said support during postforming, and pressure-applying means movable toward said open ends of said cavity dies and engageable with said hinged sections of said article support to press said articles into said cavity dies with independent rocking adjustment of said hinged sections.

5. An apparatus for postforming a conically shaped molded thermoplastic bottle closure to provide a curved tip portion on said closure comprising means for preheating the portion of said closure to be postformed, a heated cavity die having an open entrance end through which said closure to be postformed may be entered into said die and an open terminal end through which the tip of the formed closure may pass, said die having a generally frustoconical configuration with a curved section leading from a point above the base of the cone to the terminal end thereof, a closure support including a post to be received within the closure to hold the closure against displacement with respect to the support, said post extending only partially into the open end of the closure to support the same against distortion at the open end while the remainder of the closure is unsupported and free for deformation in postforming, and yielding pressing means for applying yielding force to said closure substantially in the direction of the normal axis thereof prior to postforming to press said closure into said cavity die and deform the closure to the curved configuration thereof.

6. An apparatus for postforming a conically shaped molded thermoplastic article to provide a curved tip portion on said article comprising means for preheating the portion of said article to be postformed, a heated cavity die having an entrance opening at one end and a terminal opening at the other end and a generaly frustoconical configuration therebetween, with the upper portion of the cone curved near said terminal end, an article support including a holder, means on the holder for engaging the article to be postformed to hold said article against displacement with respect to said support, said holder engaging the article to be postformed at its open end to support the same against distortion at the open end while the remainder of the article is unsupported and free for deformation in postforming, a press head engageable with said support, press means movable toward said cavity die substantially in the direction of the axis of the closure prior to postforming to press said head against said support and move said article into said cavity die to postform said article, and yielding means disposed between said press head and press means for providing a gradually increasing pressure application to said article as it is postformed.

References Cited in the file of this patent

UNITED STATES PATENTS

| | | |
|---|---|---|
| 1,738,046 | Elton et al. | Dec. 3, 1929 |
| 1,904,290 | Neidich | Apr. 18, 1933 |
| 1,984,805 | Parkhurst | Dec. 18, 1934 |
| 2,128,745 | Huff et al. | Aug. 30, 1938 |
| 2,423,246 | Martin | July 1, 1947 |
| 2,580,092 | Herbert et al. | Dec. 25, 1951 |

FOREIGN PATENTS

| | | |
|---|---|---|
| 639,997 | Great Britain | July 12, 1950 |